United States Patent
Narayanasamy et al.

(10) Patent No.: US 11,792,265 B2
(45) Date of Patent: Oct. 17, 2023

(54) LOGICAL OBSERVATION SENSORS FOR AIRBORNE AND SPACEBORNE NODES

(71) Applicant: Lockheed Martin Corporation, Bethesda, MD (US)

(72) Inventors: Senthilkumar Narayanasamy, San Jose, CA (US); John Edward Metzger, Campbell, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 123 days.

(21) Appl. No.: 17/163,734

(22) Filed: Feb. 1, 2021

(65) Prior Publication Data

US 2021/0185127 A1    Jun. 17, 2021

Related U.S. Application Data

(63) Continuation of application No. 16/182,921, filed on Nov. 7, 2018, now abandoned.

(51) Int. Cl.
*H04L 67/12*    (2022.01)

(52) U.S. Cl.
CPC .................. *H04L 67/12* (2013.01)

(58) Field of Classification Search
CPC ...... H04L 67/12; H04L 63/0428; H04W 4/38; H04B 7/18508
USPC ......................................................... 702/188
See application file for complete search history.

(56) References Cited

U.S. PATENT DOCUMENTS

| | | | |
|---|---|---|---|
| 10,498,595 B1* | 12/2019 | Narayanasamy | ... G06F 9/44505 |
| 2005/0278120 A1 | 12/2005 | Manfred et al. | |
| 2008/0258880 A1 | 10/2008 | Smith et al. | |
| 2009/0319205 A1 | 12/2009 | Borger et al. | |
| 2011/0113339 A1 | 5/2011 | Lee et al. | |
| 2012/0197856 A1 | 8/2012 | Banka et al. | |
| 2014/0013339 A1 | 1/2014 | Lee et al. | |
| 2015/0134418 A1 | 5/2015 | Leow et al. | |
| 2015/0318916 A1 | 11/2015 | Gopal et al. | |
| 2016/0034329 A1 | 2/2016 | Larson et al. | |
| 2016/0037434 A1 | 2/2016 | Gopal et al. | |
| 2017/0289253 A1 | 10/2017 | Graefe et al. | |
| 2018/0314606 A1* | 11/2018 | Bronk | ................... G06F 9/4416 |
| 2020/0028578 A1 | 1/2020 | Coleman et al. | |
| 2020/0133746 A1 | 4/2020 | Cleave et al. | |
| 2020/0145491 A1* | 5/2020 | Narayanasamy | ....... H04L 67/12 |

OTHER PUBLICATIONS

International Application No. PCT/US2019/023857, International Search Report & Written Opinion, 10 pages, dated Apr. 11, 2019.

* cited by examiner

*Primary Examiner* — Michael P Nghiem

(57) ABSTRACT

Systems, methods, and software described herein provide enhancements for the deployment and management of sensor resources across spaceborne, airborne, and ground-based physical nodes. In one implementation, a method includes collecting sensor data from physical sensors distributed over a geographic region, and establishing logical sensors based at least on requirements indicated by data requestors. The method includes allocating selected portions of the sensor data to the logical sensors to form composite sensor data based on locations monitored by the physical sensors that correspond to the requirements, and providing the composite data in one or more data streams to the data requestors as originating from the logical sensors.

18 Claims, 7 Drawing Sheets

US 11,792,265 B2

LOGICAL OBSERVATION SENSORS FOR AIRBORNE AND SPACEBORNE NODES

RELATED APPLICATIONS

This patent application is a continuation of, and claims priority to, U.S. patent application Ser. No. 16/182,921 (now abandoned) that was filed on Nov. 7, 2018, and is entitled "LOGICAL OBSERVATION SENSORS FOR AIRBORNE AND SPACEBORNE NODES," which is hereby incorporated by reference into this patent application.

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station. Although satellites and aircraft can both be configured to perform specialized operations, this equipment is typically custom-made to the particular tasks and is expensive to create and deploy, especially for organizations that may not be able to justify the use of an entire custom satellite or aircraft. As a result, organizations may avoid the use of this technology, limiting its use.

Overview

Systems, methods, and software described herein provide enhancements for the deployment and management of sensor resources across spaceborne, airborne, and ground-based physical nodes. In one implementation, a method includes collecting sensor data from physical sensors distributed over a geographic region, and establishing logical sensors based at least on requirements indicated by data requestors. The method includes allocating selected portions of the sensor data to the logical sensors to form composite sensor data based on locations monitored by the physical sensors that correspond to the requirements, and providing the composite data in one or more data streams to the data requestors as originating from the logical sensors. In some examples, a first physical sensor captures first sensor data corresponding to a first portion of an object of interest, and a second physical sensor captures second sensor data corresponding to a second portion of the object of interest. Resultant composite sensor data can comprise the first sensor data and the second sensor data which is provided to applications or data requestors as originating from a single logical sensor.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
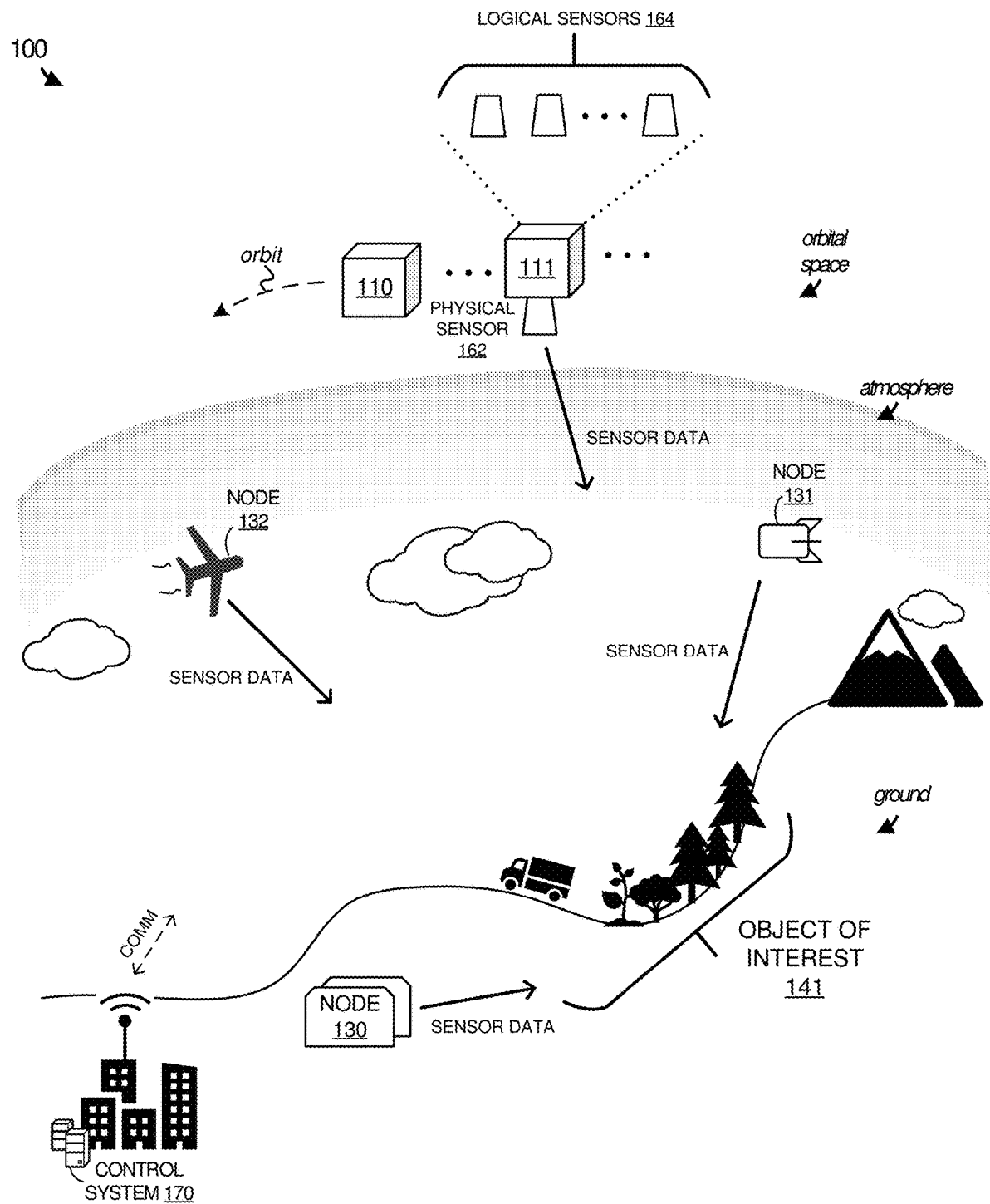
FIG. 1 illustrates a system to manage logical sensor data from physical sensors to an implementation.

FIG. 1 illustrates a system 100 to manage logical sensor data from physical sensors to an implementation. System 100 includes physical nodes (nodes) 110-111 and 130-132, and control system 170. Physical nodes 110-111 are representative of spaceborne nodes that may comprise satellites, shuttles, capsules, or other similar spaceborne entities. Physical nodes 131-132 are representative of atmospheric nodes, such as aircraft, airplanes, drones, balloons, or some other similar airborne objects capable of data processing and/or gathering sensor observation data. Physical nodes 131-132 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed.

In operation, physical nodes 110-111, and 130-132 are deployed to provide various operations for different tenants of system 100. These operations may include military, commercial, government, and civilian observation or monitoring operations, communications operations, navigation operations, weather operations, and research operations. In implementing the operations for the various tenants, control system 170 may provide an interface to the tenants, permitting the tenants to define target requirements and applications for the required operations. In some implementations, the target requirements may comprise processing resource requirements (type of processor, quantity of cores, and the like), storage requirements (quantity of storage, type of storage, and the like), communication requirements (bandwidth, throughput, target frequencies, and the like), sensor requirements (sensor type, sensor quality, and the like), geographic location requirements (defined objects and/or geographic regions of interest), or some other similar requirement. From the target requirements, an application may be developed that uses the target requirements to provide the desired functionality. This application may be deployed as a virtual machine, container, or some other virtualized endpoint that can execute on one or more physical nodes. These logical nodes may be allocated processing resources, memory resources, storage resources, communication resources, and sensor resources, wherein the sensor resources that are made available to the logical node may comprise one or more logical sensors that provide the required data for processing by the application. As an example, a tenant may generate an application that requires at least a minimum quality or types of imaging sensors, at least a minimum quantity of processing resources, and at least a minimum amount of storage. An example application may be used to monitor vehicular traffic within a defined geographic region, where the application may use the imaging data to identify particular traits in the traffic and report the information to control system 170.

In some implementations, when the applications are deployed in system 100, the applications may be allocated logical sensors rather than physical sensors. These logical sensors may be allocated data from one or more physical sensors based on the requirements for the application. As an example, in system 100, physical sensor 162 may collect sensor data, wherein the sensor data may correspond imaging data, motion data, light data, or some other similar type of sensor data. As the data is collected, physical node 111, or some other physical node in system 100, may apportion the sensor data to logical sensors 164. Once apportioned, physical node 111 may provide one or more data streams to data requestors as originating from logical sensors 164. As an example, an application operating in a first logical node (container, virtual machine, or some other logical node executed by one or more physical nodes) may be allocated a first logical sensor in logical sensors 164, while a second application operating in a second logical node may be allocated a second logical sensor in logical sensors 164. As a result, rather than obtaining data directly from the physical node, a management platform operating on the physical nodes of system 100 may allocate data from the physical sensors to various logical sensors, permitting logical nodes executing in system 100 to obtain data from specific logical sensors allocated to the logical nodes.

In some implementations, the logical sensors may be provided with a portion of the sensor data that is collected from physical sensor 162. As an example, a logical node may be interested in object of interest 141 and none of the other data collected from physical sensor 162. To accommodate the requirements of the logical node, the management platform of physical node 111 may identify pertinent portions of sensor data for physical sensor 162 and allocate the portions to a logical sensor for the logical node. Once allocated or apportioned to the logical sensor, the associated logical node may obtain the data via a data stream associated with the particular logical sensor. Thus, if physical sensor 162 represented an imaging sensor, physical node 111 may identify portions of the imaging data from the imaging sensor that correspond to object of interest 141 and allocate the portions to the logical sensor associated with the logical node.

In some examples, logical sensors may be apportioned composite data from multiple physical sensors as a single logical sensor. As an example from system 100, node 111 and node 132 may obtain sensor data related to object of interest 141. Rather than providing the data as separate sensors, one or more of the physical nodes of system 100 may process the sensor data from multiple sensors to generate composite sensor data that can be provided as a single logical sensor to a particular application. Thus, if an application operating in a logical node required a sensor that provides imaging data for all of object of interest 141, imaging data from multiple physical sensors may be required to support the single image. Thus, if physical node 110 included an imaging sensor that collected imaging data for a first portion of object of interest 141 and physical node 111 included a second imaging sensor that collected imaging data for a second portion of object of interest 141, the management platform may be used to process the imaging data from the two sensors to generate composite data. When the composite imaging data is generated, the composite imaging data may be allocated to a logical sensor, wherein the application can access data from the logical sensor in the same manner as a physical sensor. Accordingly, although a single sensor may be incapable of providing the required data for a logical node, a management platform may provide a logical sensor capable of providing the required sensor data.

In some implementations, prior to apportioning the data to the logical sensors 164, the management platform of physical node 111 may process the data to provide specific data. This processing of the data may include modifying the format of the data from a first format to a second format, may comprise selecting portions of the sensor data, may comprise compiling data from multiple physical sensors into a composite data, or some other similar processing of the data prior to apportioning the data to a logical sensor. As an example, an imaging sensor may collect data in a first format, but a logical node may require a second format to provide required operations. To generate the sensor data in the second format, the management platform, which may comprise its own applications and logical nodes, may obtain the data from the physical sensor, execute processes to convert the data from the first format to the second format, and apportion the data to at least one logical sensor. After the data is apportioned to the logical sensor, any requestor associated with the at least one logical sensor, such as a logical node or other application, may request and obtain the data from the logical sensor.

In some examples, the physical sensors that are associated with the logical sensors may change over time. In particular, while a logical node may be assigned a logical sensor to provide sensor operations on particular objects of interest, the physical nodes in system 100 may be mobile requiring a change to the physical nodes that support the particular object of interest. As an example, physical node 110 may initially provide the physical sensor data required for a logical sensor, however, due to the orbit of physical node 110, the physical sensor data required for the logical sensor may be transitioned to physical node 111. In the transition, the management platform provided in system 100 may identify the transition event and determine one or more alternative physical sensors capable of supporting the data for the logical sensor.

Figure 2:
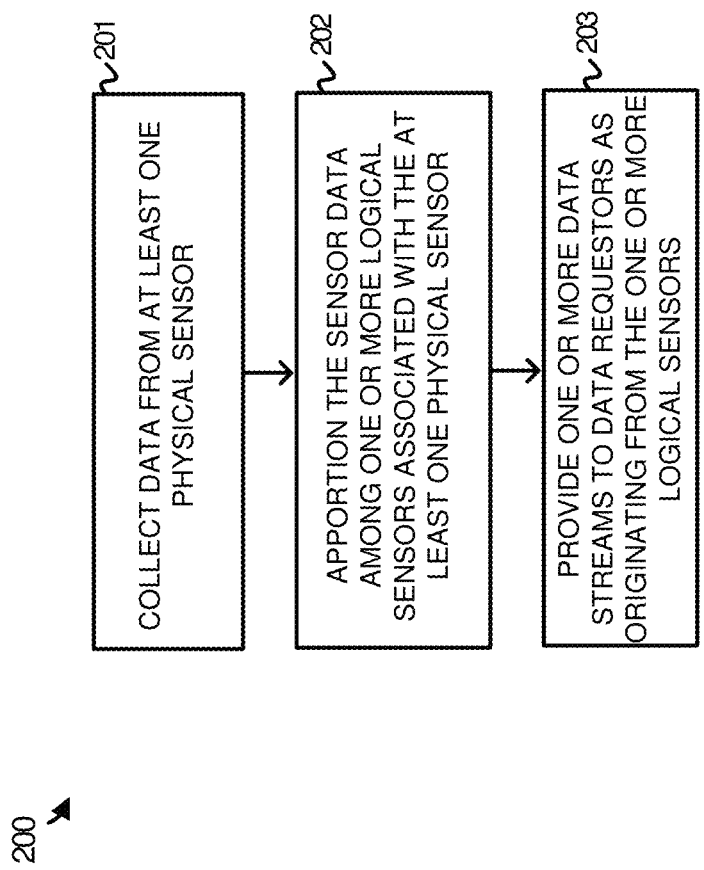
FIG. 2 illustrates an operation of a system to manage logical sensors according to an implementation.

FIG. 2 illustrates an operation 200 of a system to manage logical sensors according to an implementation. The processes of operation 200 are referenced parenthetically in the paragraphs that follow with reference to elements of system 100 of FIG. 1. Operation 200 is described as executing in physical node 111, however, other physical nodes in system 100 may provide similar operations and may provide the operations as a single entity in some examples.

As depicted operation 200 includes collecting (201) sensor data from at least one physical sensor. The at least one physical sensor may comprise one or more motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other similar sensors. As the data is collected from the at least one physical sensor, operation 200 further apportions (202) the sensor data among one or more logical sensors associated with the at least one physical sensor. Referring to the example of system 100, physical node 111 obtains sensor data from physical sensor 162. As the sensor data is obtained, physical node 111 and a management platform operating thereon may determine one or more logical sensors that are associated with the physical sensor. Once identified, the data may be apportioned to each of the logical sensors as required. In some implementations, each of the logical sensors may obtain the same data, such as the same image. In other implementations, one or more of the logical sensors may obtain different portions of the sensor data, such as different portions of the images from one or more imaging sensors.

In some implementations, prior to apportioning the sensor data to the various logical sensors, physical node 111 or another physical node in system 100 may process the data from the at least one sensor prior to allocating the data to the logical sensors. This processing may include identifying a subset of the sensor data that is relevant to the logical sensor, generating composite data from multiple physical sensors, converting a format of the data from the physical sensor to a format associated with the logical sensor, or some other similar operation associated with the data from the physical sensor. Once the sensor data is processed, in some examples using different pre-processing operations for each of the logical sensors, the processed sensor data may be apportioned to logical sensors 164. As an example, a logical sensor in logical sensors 164 may require a data format that is different than the format that is provided by physical sensor 162. Consequently, physical node 162 may process the data obtained from physical sensor 162 to generate second data for the logical sensor and may allocate the second data as the sensor data for the logical sensor.

Once the sensor data is apportioned to logical sensors 164, operation 200 further provides (203) one or more data streams to data requestors as originating from the logical sensors. In some implementations, the data requestors may comprise applications that are deployed in system 100, wherein the applications may execute in logical nodes each allocated processing resources, storage resources, communication resources, and sensor resources. In the present implementation, the sensor resources that are allocated to each of the logical nodes include at least one logical sensor that is used to provide data for processing and/or storage by the application. The logical node may comprise a container, a virtual machine, or another virtual computing element that can be executed using resources from one or more physical nodes. In obtaining data for the application in the logical node, the application may generate requests for the at least one logical sensor that is allocated to the logical node and system 100 may provide a data stream with the required data to the requesting application.

As an example, a container executing on physical node 111 may generate a request to obtain data from a logical sensor of logical sensors 164 that corresponds to the container. In response to the request, a data stream with the apportioned data for the logical sensor may provide data for the requesting application. In this manner, a single physical sensor may provide data to multiple logical sensors or, likewise, multiple physical sensors may be used to provide data to a single logical sensor.

In at least one implementation, in apportioning the sensor data to the various logical sensors, physical node 111 may persist (store or cache) a portion of the sensor data, such that the sensor data may be time-shifted for the logical node associated with the logical sensor. In caching the data, applications that do not require real-time processing of the data may access the data later. Thus, while a logical node may not currently be executing when the data is obtained, the logical node may process the persistent sensor data from the logical sensor in a similar manner to the real-time processing applications.

In some examples, similar to persisting the data for a logical sensor, the physical nodes of the system may store the raw sensor data such that it can be made available as an application as a logical sensor at a later time. This sensor data may be stored locally at the collecting physical node, may be stored on another physical node, or may be stored on a ground storage system for the collecting sensors. As an illustrative example, an application that is either currently executing or executing at a future time, may provide a request for data that was gathered during an earlier period. Rather than processing the data directly from storage, a logical sensor may be generated or allocated to the application, such that the application may process the data as though the data is obtained in real-time. Thus, although data may be stored from an earlier period, various applications may request access to the data, and be provided with the data via a logical sensor as though the data is collected in real-time. In providing the stored data to the requesting application, the management platform may process the data prior to providing the data to the application. This processing of the data may include modifying a format of the data for the logical sensor, identifying objects of interest in the data and providing sensor data associated with the objects of interest, generating composite data from multiple sensors, or providing some other similar processing operation on the data prior to apportioning the data to the allocated logical sensor.

In some implementations, a first logical node may provide operations on sensor data prior to providing the data to a second logical node. For example, a first logical node associated with a first logical sensor may obtain data from the first logical sensor using a first data stream. The first logical node may then process the sensor data and generate second sensor data that can be apportioned to one or more additional logical sensors. In processing the data, the first logical node may convert the data from a first format to a second format, identify relevant portions of interest in the sensor data to be provided as the second data, or provide some other similar operation with respect to the data. As an example, first imaging sensor data may be obtained from physical sensor 111 and apportioned to a first logical node and sensor, where the first logical node may process the imaging data to generate second imaging data. This second imaging data may comprise the imaging data in a different format, a particular portion of the imaging data that is pertinent as second imaging data, or some other similar processing of the imaging data, including combinations thereof. As the second imaging data is generated, the first logical node may apportion the data to one or more secondary logical sensors that are associated with secondary logical nodes. Advantageously, the secondary logical nodes may be provided with preprocessed data, but may interact with and request the data as though the data were a sensor. In one example, this could permit multiple logical nodes that each expect a different portion or subset of the original data to obtain the required data through operations of another logical node.

Figure 3:
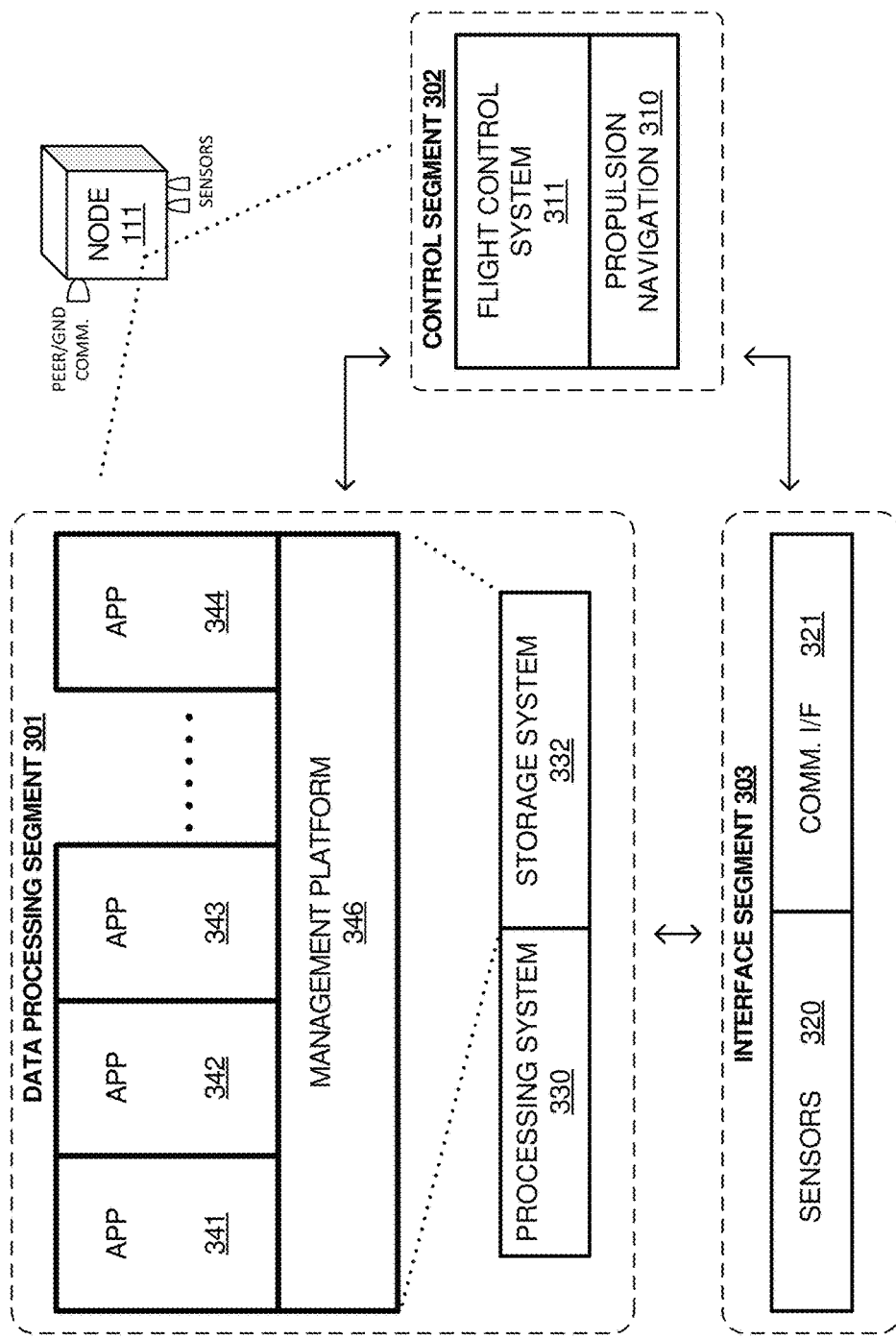
FIG. 3 illustrates an expanded view of a physical node according to an implementation.

FIG. 3 illustrates an expanded view 300 of physical node 111 of FIG. 1 according to an implementation. Physical node 111 can be an example of any of nodes 110-111 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes in an observation system may provide a platform for various tenants to deploy and execute applications that provide various operations. These operations may include military and civilian observation operations, communications operations, navigation operations, weather operations, and research operations. As depicted in expanded view 300, data processing system 301 includes processing system 330 and storage system 332, where storage system 332 stores management platform 346 (operating system, hypervisor, or the like), and applications 341-344. Applications 341-344 execute on top of management platform 346 and may operate inside of one or more logical nodes, where the logical nodes may comprise containers, virtual machines, or some other similar virtualized element. In some examples, applications 341-344 may use logical sensors to obtain required sensor data for the applications. In particular, the logical nodes that support applications 341-344 may each be allocated one or more logical sensors that can provide imaging sensor data, motion sensor data, seismological sensor data, or some other similar sensor data.

In allocating the sensor data to each of the logical sensors, management platform 346 may be used to obtain data from at least one physical sensor of sensors 320 and/or other physical sensors from other physical nodes of system 100. As the data is received, management platform 346 may apportion the sensor data among one or more logical sensors associated with the at least one physical sensor. A logical sensor may be apportioned all of the data from the at least one physical sensor, may be apportioned a subset of the data from the at least one physical sensor, may be apportioned processed data from the at least one physical sensor, or may be apportioned any other portion of the data from the at least one physical sensor. The allocation of the sensor data to each of the logical sensors may be based on the requirements and/or preferences of each of the applications associated with the logical sensors. These requirements may comprise objects or geographic areas of interest, imaging or other data formats, or some other similar requirement for the application. As a result, a first portion of the sensor data may be allocated to a first logical sensor, while a second portion of the sensor data may be allocated to a second logical sensor.

In some implementations, when the sensor data is obtained from the at least one physical sensor, management platform 346 may be responsible for identifying the logical sensors that correspond to the obtained data. This determination may be based on the activity states of the logical nodes and applications (e.g., executing, paused, etc.), may be based on the geolocation from which the data was gathered, may be based on a quality of service associated with the logical nodes, or may be based on any other similar factor. As an example, when data is obtained from an imaging sensor, management platform 346 may determine the current geographic region associated with the imaging data and determine any logical sensors that correspond to the geographic region of interest. Once the logical sensors are identified, sensor data may be apportioned to the corresponding sensors.

Although the previous example identified logical sensors based on the geolocation associated with the data, management platform 346 may provide further operations on (or processing of) the sensor data from the physical sensors prior to apportioning the data to the corresponding logical sensors. These operations may include generating composite data from two or more sensors, modifying the format of the sensor data to a second format associated with a logical sensor, or providing some other similar process on the data to provide the required data to the corresponding logical sensor.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the senor during defined time periods, may jointly obtain data derived from the sensor at the same time (e.g. all logical nodes can access the same imaging data), or may be provided access to sensors at some other interval. In other implementations, sensor data from sensors 320 may be apportioned to logical sensors associated with applications 341-344, wherein the logical sensors may be provided data based on preferences or requirements of the specific application. In addition to sensors 320, interface segment 303 further includes communication interface 321 that may be used to communicate with other physical nodes and/or management systems for system 100. In some examples, communication interface 321 may work with management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
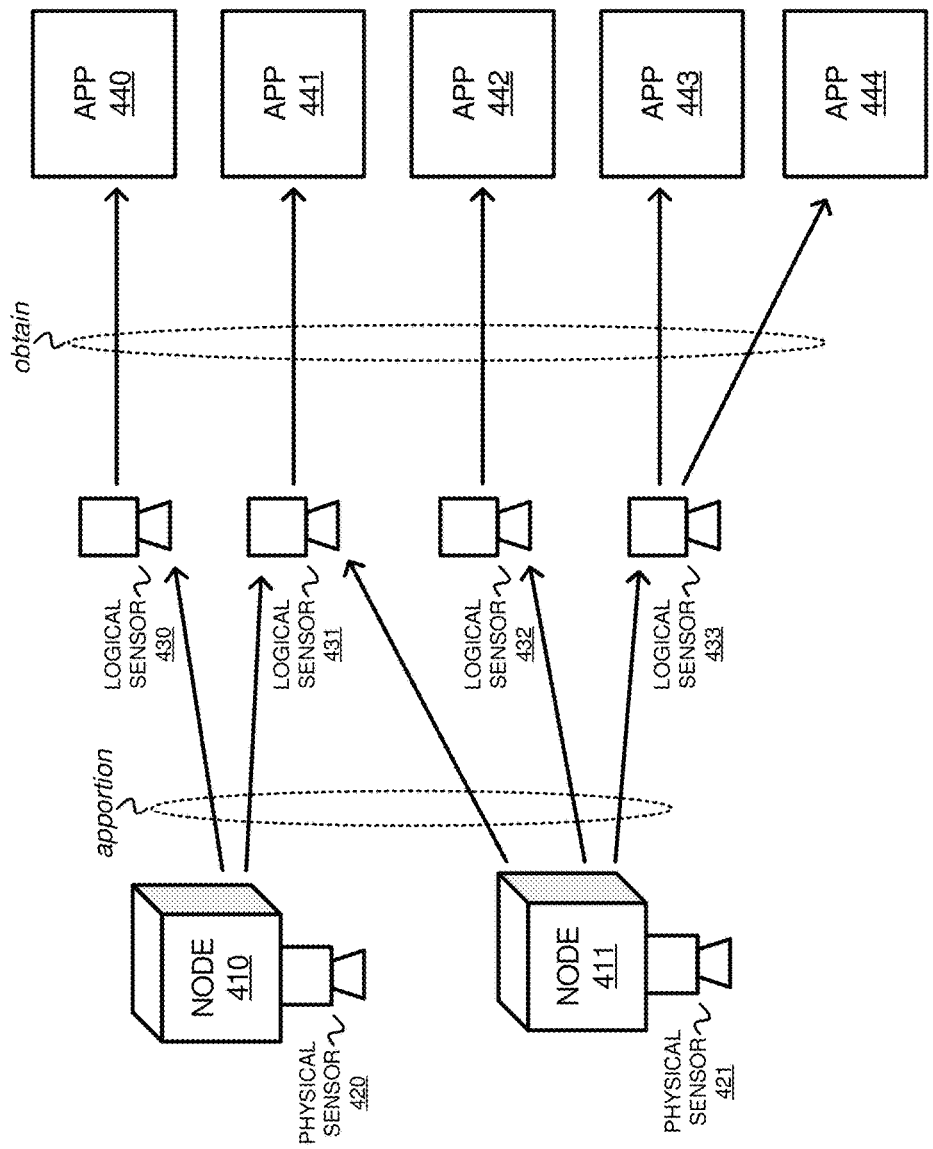
FIG. 4 illustrates an operational scenario of apportioning sensor data to logical sensors according to an implementation.

FIG. 4 illustrates an operational scenario 400 of apportioning sensor data to logical sensors according to an implementation. Operational scenario 400 includes physical nodes 410-411 with corresponding physical sensors 420-421, logical sensors 430-434, and applications 440-443. Applications 440-444 may execute on one or more of physical nodes 410-411 or some other node in a deployed physical node system. The physical nodes of the system may comprise airborne nodes, spaceborne nodes, land vehicles, water vehicles, or some other similar physical node.

As described herein, physical nodes 410-411 collect sensor data from corresponding sensors 420-421. As the sensor data is obtained, a management service executing on one or more of physical nodes 410-411 is used to apportion the data to logical sensors 430-434 associated with physical sensors 420-421. Here, at least a portion of the data from physical sensor 420 is apportioned to logical sensors 430-431, while at least a portion of the data from physical sensor 421 is apportioned to logical sensors 431-433. In some implementations, in apportioning the data to each of the logical sensors, the management platform may identify relevant portions of the data for the logical sensor based on the parameters of the application associated with the logical sensor. For example, physical sensor 420 may represent an imaging sensor that gathers imaging data for a first geographic region. As the data is gathered from the physical sensor, the management service executing on the one or more physical nodes may identify that the data is relevant to logical sensor 430 and determine a portion of the data to be supplied to logical sensor 430. Thus, if logical sensor 430 required data about a geographic region of interest that represented a portion of the first geographic region, the management service may identify the portion of the raw data from the logical sensor and provide that data that corresponds to the geographic region of interest. Other operations in apportioning the sensor data to the logical sensors may include converting the format of the data from the physical sensor to a format that is expected by the application associated with the sensor, converting the resolution of the data from a first resolution to a second resolution, or some other similar process with relation to the sensor data.

As further demonstrated in FIG. 4, some of the logical sensors may include data obtained from multiple physical sensors. In some implementations, the management platform may process the sensor data prior to apportioning the data to the logical sensor. This processing may include identifying portions of the data that are relevant for the logical sensor, determining composite data for the logical sensor, or providing some other processing operation with respect to the data from the physical sensors. Using the example of logical sensor 431, physical sensors 420-421 may correspond to imaging sensors capable of gathering images related to an object of interest. From the raw data obtained from the physical sensors, the management platform may identify relevant portions of the imaging data that correspond to an object of interest for application 441 and logical sensor 431. Once the relevant portions are identified and the composite data is generated from physical sensors 420-421, the composite data may be apportioned to the logical sensor. Application 441 may then request and receive data from a data stream corresponding to the logical sensor to provide the required operations.

In some implementations, the logical sensors that are allocated to a logical node may be dynamic based on the movement of the physical sensors. As a satellite system example, physical sensor 420 may initially perform sensor gathering operations for a logical sensor, but due to the orbit of physical node 410 may be unable to perform the required operations. Consequently, the data gathering operations may be transitioned to a second physical node, such as physical node 411 to provide the desired operations. In transitioning between physical nodes, the management platform may dynamically modify the physical sensor resources that correspond to each of the logical sensors. Thus, while the application may request and obtain data from the same data stream and logical sensor, the physical resources that provide the data to the logical sensor may change based on the movement of the physical nodes in the system.

In some implementations, in managing the data that is apportioned to each of the logical sensors, the data may be encrypted to prevent access to the data from other applications and processes. In particular, as the data is allocated to each of the logical sensors, the management platform may encrypt the data that is provided in the data stream to the application. Referring to an example in operational scenario 400, the management platform for node 411 may encrypt the data that is provided to logical sensor 433 using first encryption parameters. As a result, when application 443 requests data from the logical sensor, application 443 may include encryption parameters to decrypt the data provided in the data stream for processing by the application. This encryption may prevent other applications that address the logical sensor from obtaining and processing data associated with the logical sensor.

In some implementations, when multiple applications share the same logical sensor, such as the example with application 443 and application 444, the data apportioned to the sensor may be stored in separate encrypted data pools. These separate encrypted data pools ensure that a first application accessing the sensor is incapable of obtaining and processing improper data that was obtained from the sensor by another application. As a result, when then data is encrypted for each of the pools, each of the pools may be associated with different encryption parameters. Once a request is generated from the application to the logical sensor, the logical sensor may identify the source of the request and provide data as a data stream from the storage pool associated with the request. Once received by the application, the application may decrypt the data using the encryption parameters and process the data as required.

Figure 5:
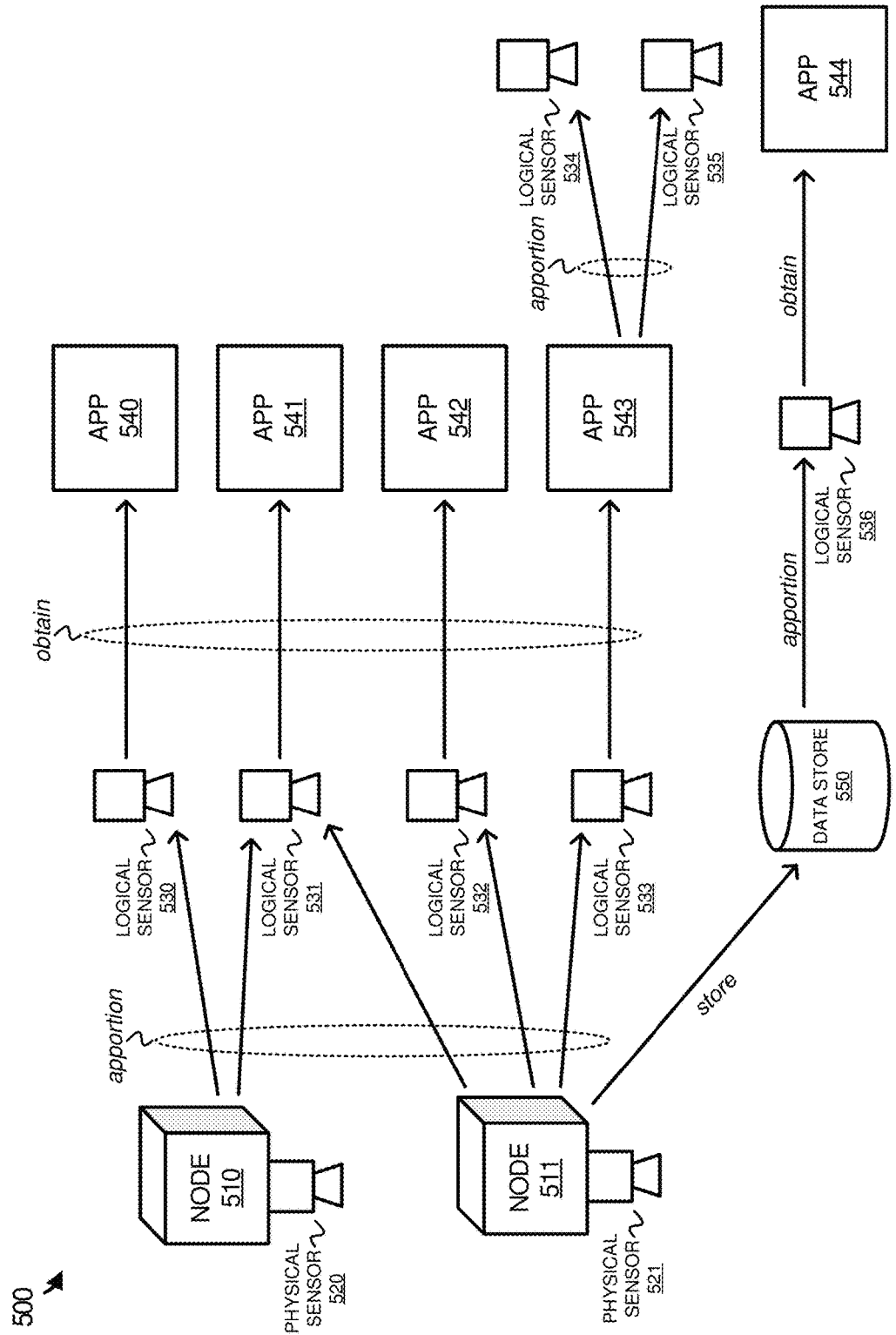
FIG. 5 illustrates an operational scenario of apportioning sensor data to logical sensors according to an implementation.

FIG. 5 illustrates an operational scenario 500 of apportioning sensor data to logical sensors according to an implementation. Operational scenario 500 includes physical nodes 510-511 with corresponding physical sensors 520-521, logical sensors 530-536, applications 540-544 and data store 550. Applications 540-544 may execute on one or more of physical nodes 510-511 or some other node in a deployed physical node system. The physical nodes of the system may comprise airborne nodes, spaceborne nodes, land vehicles, water vehicles, or some other similar physical node.

In operation, physical nodes 510-511 provide a platform for the execution of applications 540-544, wherein applications 540-544 may execute in a virtual machine, container, or some other logical or virtual endpoint. In providing the required operations for applications 540-543, physical nodes 510-513 include physical sensors 520-521 capable of gather various data for the applications. Here, rather than permitting the applications to individually communicate with and obtain data from physical sensors 520-521, a management platform may be used that can obtain data from the physical sensors and apportion the data to the corresponding logical sensors. In the example of operational scenario 500, physical nodes 510-511 provide data from physical sensor 520 to logical sensors 530-531 and data from physical sensor 521 to logical sensors 531-533. In apportioning the data to each of the logical sensors, the management platform of the physical nodes may provide various processing operations on the data. This processing may include identifying relevant portions of the data for each of the logical sensors, converting formats of the data from a first format to a second format, generating composite data from multiple sensors, or providing some other similar operation with respect to the sensor data. In some implementations, the apportioning of the data may be based on the requirements of the application (logical node), wherein the requirements may comprise quality requirements, format requirements, objects or regions of interest, or some other similar requirement that may be defined when the application is deployed. Once the data is apportioned to each of the logical sensors, data requestors, which in this example include applications 540-543, may request and obtain data from each of the logical sensors using data streams associated with each of the logical sensors.

In some implementations, rather than obtaining data in real-time from the logical sensors, data may be persisted or cached for future use by the application. For example, application 540 may not require real-time processing of data obtained from physical sensor 510. Instead, application 540 may be allocated a lower quality of service that permits application 540 to process the data at a later time. Accordingly, if the logical node supporting application 540 were initiated at a later time, application 540 may generate requests of logical sensor 530 and process the data from the data stream as though the data had been obtained in real-time.

As further demonstrated in operational scenario 500, at least a portion of the applications may be used to process sensor data and apportion the processed sensor data to one or more secondary logical sensors. In the example of application 543, application 543 requests data from a data stream that corresponds to logical sensor 533. This sensor data may comprise imaging data, heat data, seismic or motion activity data, or some other similar data. As the data is obtained, application 543 may process the data to identify portions of interest for logical sensors 534-535, convert the format of the data, or provide some other similar operation with respect to the data. Once the operations are performed on the data, application 543 may apportion the processed data among logical sensors 434-535 associated with application 543, which permits one or more other applications to access the processed data as data streams from logical sensors 534-535.

In some implementations, rather than directly apportioning the data to a logical sensor, the data may be cached or stored in a data store, such as data store 550. In particular, as the data is collected from a physical sensor, such as physical sensor 521, the data may be cached in data store 550, which may be located on physical node 511, on another physical node of the system, or on a ground storage system accessible to the physical nodes. As the data is stored, applications may generate requirements to access and process the data. Consequently, the management platform for the application may allocate or generate a new logical sensor 536 for the requesting application. Once the logical sensor is allocated, data from data store 550 may be apportioned to logical sensor 536, permitting the application 544 to obtain and process the data as though the data were being received in real-time. Further, in some implementations, prior to apportioning the data, the system may process the data to provide required data associated with the application. This processing may include modifying a format of the data for the logical sensor, identifying objects of interest in the data and providing sensor data associated with the objects of interest, generating composite data from multiple sensors, or providing some other similar processing operation on the data prior to apportioning the data to the allocated logical sensor.

Figure 6:
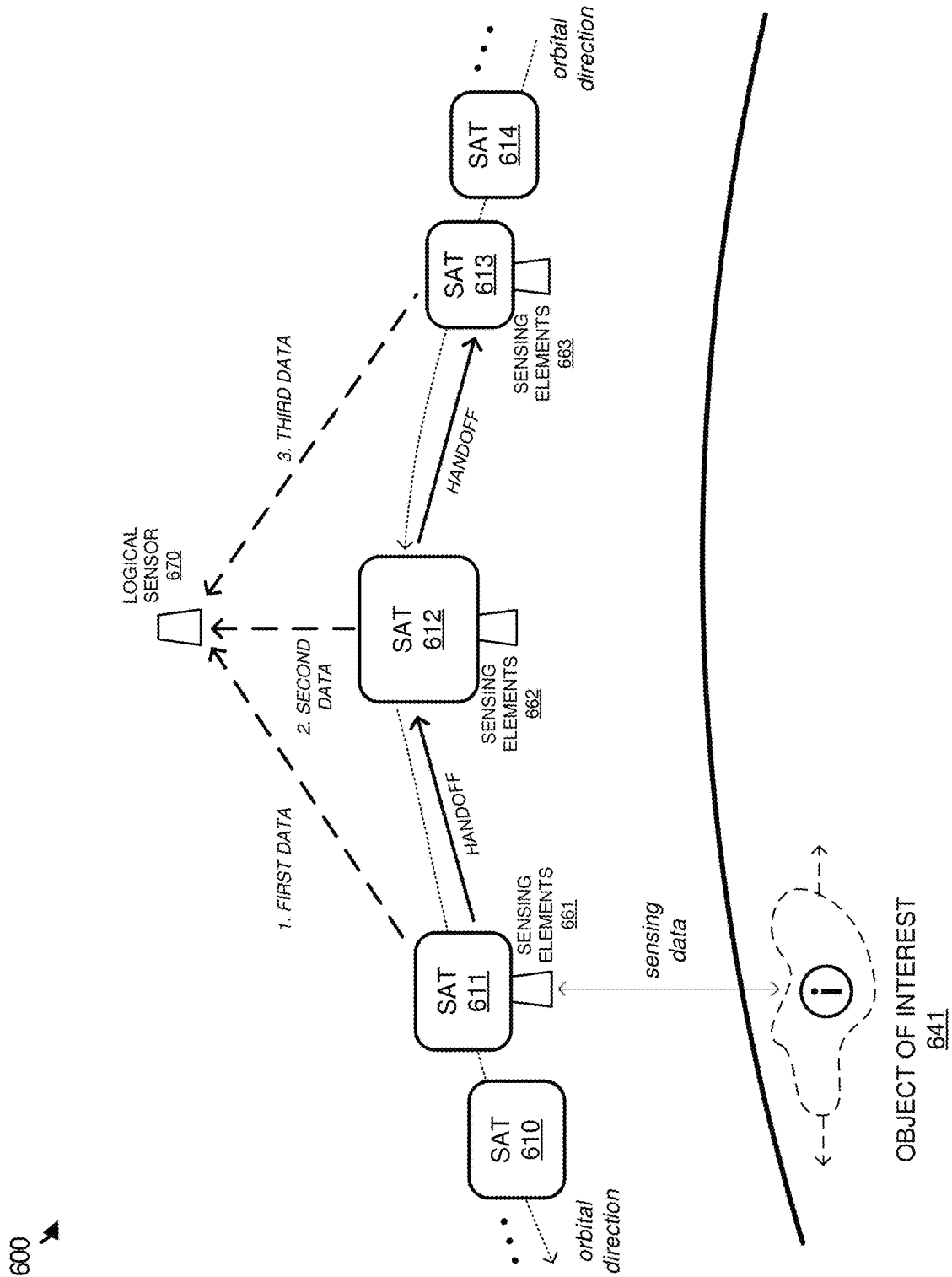
FIG. 6 illustrates an operational scenario of apportioning sensor data to logical sensors according to an implementation.

FIG. 6 illustrates an operational scenario 600 of apportioning sensor data to logical sensors according to an implementation. Operational scenario 600 includes satellites 610-614, object of interest 641, and logical sensor 670. Satellites 611-613 include sensing elements 661-663 that may comprise one or more physical sensors.

As depicted in operational scenario 600, satellite 611, at step 1, may obtain sensing data regarding object of interest 641 and allocate at least a portion of the sensing data to logical sensor 670. In some implementations, when applications are deployed in a sensing system, the applications may use logical sensors that are allocated to the applications to provide the required operations. These logical sensors may be allocated as part of the logical node in some examples, wherein the sensor data provided to each of the logical sensors may be determined based on requirements of the associated application. For instance, a container that executes an application may be provided with addressing information that permits the container to address logical sensor 670 as though logical sensor 670 were a physical sensor available to the application. In apportioning the data to logical sensor 670, a management service that can be located on one or more of satellites 610-614 may obtain the required data from the one or more physical sensors and apportion any required data to logical sensor 670. As a result, during step 1, the management service may identify relevant data for logical sensor 670 that corresponds to object of interest 641 and may apportion the relevant data to logical sensor 670. Once apportioned, the application associated with logical sensor 670 may request and obtain the apportioned data as a data stream to provide the required operations.

In some implementations, when the management platform determines what data should be provided to a logical sensor, the management platform may provide various operations on the data prior to providing the data. These processes or operations on the data may include identifying a subset of the data that is relevant for the for the logical sensor, generating composite data from multiple sensors, converting a format of the data from the physical sensor to a format for the logical sensor, or some other similar operation. For instance, when satellite 611 obtains data from sensing elements 661, the sensor data may provide sensor data for object of interest 641 as well as other objects that are not of interest to logical sensor 670. As an example, an imaging sensor may obtain imaging data for object of interest 641 (geographic area of interest) as well as other geographic regions. Consequently, to provide the required data for logical sensor 670, satellite 611 or some other physical node in the system may process the sensor data to extract the portion of data that is relevant to logical sensor 670. Once extracted, the extracted sensor data may be provided as the sensor data to logical sensor 670, permitting applications to access the required data via a data stream from the logical sensor.

As demonstrated in FIG. 6, satellites in an observation system may comprise mobile physical nodes capable of providing sensor data for various periods of time. In particular, due to the orbit of satellite 611, the physical sensing elements 661 of satellite 611 may only provide relevant sensor data for logical sensor 670 during a portion of its orbit. Consequently, satellite 611 may handoff the gathering of data from the physical sensors to satellite 612 and satellite 612 may obtain second data, at step 2, via sensing elements 662 for logical sensor 670. In some implementations, the handoff to satellite 612 may comprise a complete handoff to the sensors located on satellite 612. In other implementations, the data from sensing element 661 and sensing elements 662 may be used to generate composite data, wherein data from satellite 611 may be combined with data from satellite 612 to generate the required data for logical sensor 670. Similar operations may also be provided, at step 3, when satellite 612 initiates a handoff to satellite 613, permitting sensing elements 663 to provide the required sensor data for logical sensor 670. In this manner, although an application may request and obtain data from the same logical sensor, the satellite platform may modify the physical sensors that are used to provide the required data. These modifications may be defined by the administrator at the time of deploying an application and logical node, may be defined during the operation of the logical node (e.g., identifying and object of interest during the operation of the application), or may be defined using any other similar operation. Thus, rather than changing the configuration of the physical nodes, the management service may be used to transition a logical sensor from a first set of one or more physical sensors to a second set of one or more physical sensors.

Although demonstrated in the example of FIG. 6 using satellites for physical nodes, other systems may employ various airborne, spaceborne, and ground-based systems to provide the sensor data gathering operations. In some implementations, the various physical nodes may further include processing systems, storage systems, and communication resources to support logical nodes and corresponding applications. As a result, while a first physical node may obtain the required sensor data, the management platform that operates on the physical nodes may forward the data to any of the physical nodes that are executing the application. This allows an application for a logical node to execute on a first physical node, while other resources, including physical sensors that provide data to the application may be located on one or more other physical nodes.

Figure 7:
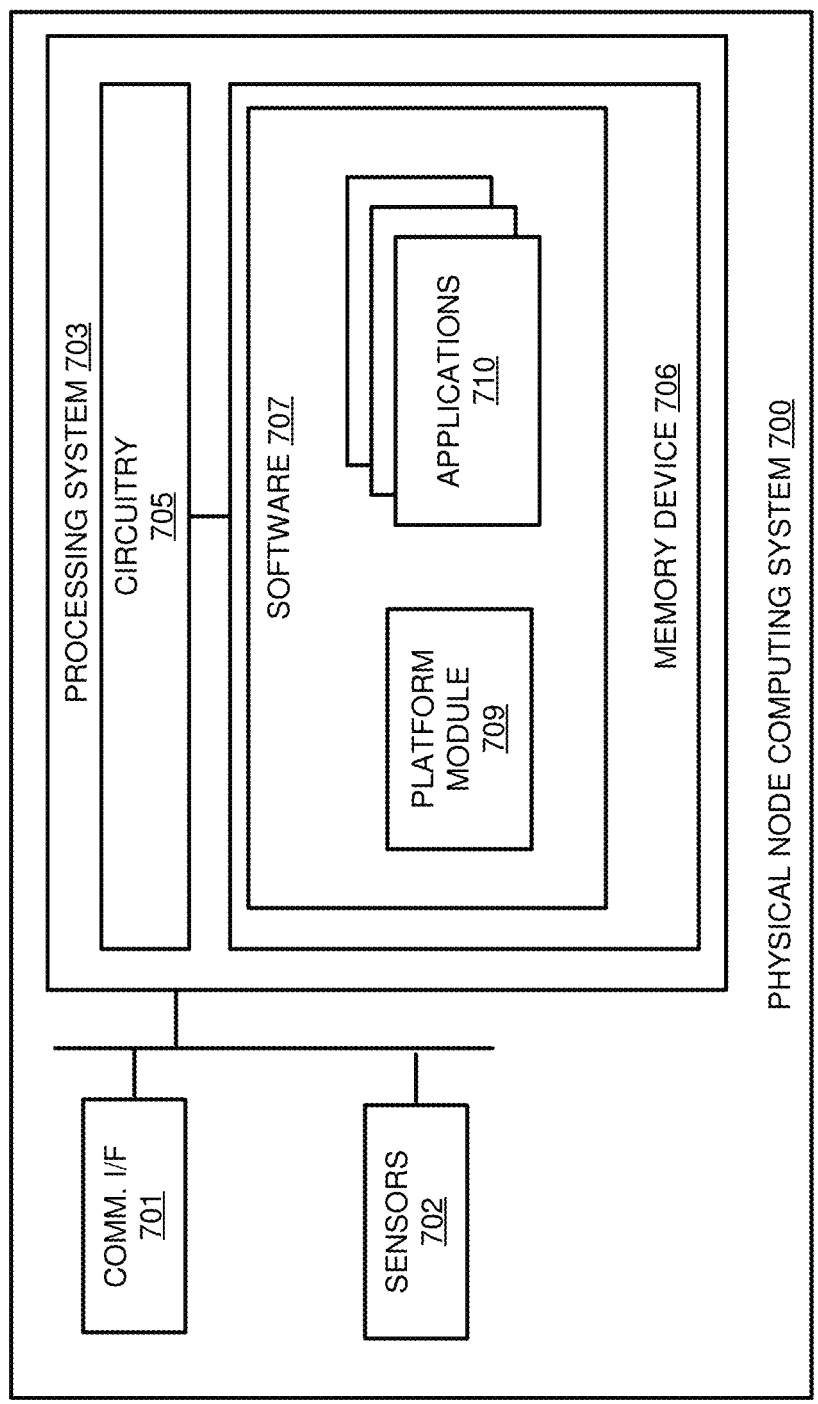
FIG. 7 illustrates a physical node computing system according to an implementation.

FIG. 7 illustrates a physical node computing system 700 according to an implementation. Computing system 700 is representative of any computing system or systems with which the various operational architectures, processes, scenarios, and sequences disclosed herein for a physical node may be implemented. Computing system 700 is an example of physical nodes 110-111 and 130-132 in FIG. 1, although other examples can be employed. Computing system 700 comprises communication interface 701, sensors 702, and processing system 703. Processing system 703 is linked to communication interface 701 and sensors 702. Sensors 702 may comprise imaging sensors, heat sensors, proximity sensors, acoustic sensors, vibration sensors, light sensors, or some other similar type of sensor. Processing system 703 includes processing circuitry 705 and memory device 706 that stores operating software 707. Computing system 700 may include other components such as a power system, photovoltaic solar panels, battery, and enclosure that are not shown for clarity.

Communication interface 701 comprises components that communicate over communication links, such as network cards, ports, radio frequency (RF), processing circuitry and software, or some other communication devices. Communication interface 701 may be configured to communicate over conductive, wireless, or optical links. Communication interface 701 may be configured to use Time Division Multiplex (TDM), Code Division Multiplex (CDM), Internet Protocol (IP), Ethernet, optical networking, wireless protocols, communication signaling, or some other communication format, including combinations thereof. In at least one implementation, communication interface 701 may be used to communicate with a control system and one or more other physical nodes in a converged system, where the physical nodes may comprise mobile or stationary devices, such as satellites, drones, airplanes, or balloons, land and water vehicles, stationary surface or sub-surface nodes, or some other devices.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes platform module 709 and applications 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, platform module 709 directs processing system 703 to provide a platform for the execution of applications 710, wherein applications 710 may execute as logical nodes in some examples. The logical nodes may comprise virtual machines, containers, or some other virtualized endpoint that may execute using physical resources from one or more physical nodes. These physical resources may comprise storage resources, communication resources, sensor resources, or some other similar resource. In providing sensor resources to applications 710, platform module 709 may be used to apportion sensor data to logical sensors associated with each of the applications. In particular, platform module 709 may obtain sensor data from sensors 702 (or physical sensors on other physical nodes) and apportion the sensor data among logical sensors associated with the physical sensors. Once apportioned, applications 710 may request and be provided with data streams associated with the logical sensors.

In some implementations, in apportioning the data to the logical sensors, platform module 709 may process the data prior to apportioning the data. For example, platform module 709 may identify a subset of the sensor data that is relevant to an application associated with a logical sensor, may modify a format of the data from a first format to a second format, may generate composite data from multiple sensors and allocate that data as a single sensor, or may provide any other similar processing operation. Further, in apportioning the data to the logical sensors, at least a portion of the logical sensors may have the sensor data cached (or persisted) for later processing by an application. This caching may be based on a quality of service associated with the applications, permitting applications with a lower quality of service to process data from any associated logical sensors at a later time, reserving resources for other applications.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    collecting sensor data from physical sensors distributed over a geographic region;
    establishing logical sensors each apportioned composite sensor data having selected portions of the sensor data originating from more than one of the physical sensors, wherein the selected portions of the sensor data are selected based at least on locations monitored by the physical sensors that correspond to requirements indicated by data requestors;
    providing the composite sensor data in one or more data streams to the data requestors as originating from the logical sensors;
    identifying a transition event associated with a first physical sensor being unable to capture further sensor data for at least an object of interest in the geographic region;
    determining one or more alternative physical sensors capable of capturing the further sensor data; and
    in response to the transition event, transitioning a corresponding logical sensor to receive data from the one or more alternative physical sensors instead of the first physical sensor.

2. The method of claim 1, comprising:
    collecting the selected portions of the sensor data from multiple ones of the physical sensors and compositing the selected portions of the sensor data into the composite sensor data as corresponding to a single logical sensor addressable as a physical sensor.

3. The method of claim 1, wherein the selected portions of the sensor data correspond to the first physical sensor for a first period of time and to a subsequent physical sensor for a second period of time.

4. The method of claim 3, wherein the first period of time and the second period of time correlate to orbital movement with respect to the geographic region for satellite devices comprising the first physical sensor and the subsequent physical sensor.

5. The method of claim 1, wherein the first physical sensor captures first sensor data corresponding to a first portion of the object of interest, and wherein a second physical sensor captures second sensor data corresponding to a second portion of the object of interest, and wherein the composite sensor data comprises the first sensor data and the second sensor data.

6. The method of claim 1, further comprising:
    converting the selected portions of the sensor data in a first data format to a target data format comprising the composite sensor data.

7. The method of claim 1, further comprising:
    processing the sensor data to identify relevant portions of the sensor data according to the requirements indicated by the data requestors; and
    allocating the relevant portions of the sensor data to corresponding logical sensors.

8. The method of claim 1, further comprising:
    storing the composite sensor data as separate encrypted data pools that each correspond to individual ones of the data requestors.

9. The method of claim 1, further comprising:
    in a management service located on one or more of orbital satellites, obtaining the sensor data and allocating the selected portions of the sensor data to the logical sensors.

10. An apparatus comprising:
    one or more non-transitory computer readable storage media;
    program instructions stored on the one or more non-transitory computer readable storage media that, based on being executed by a processing system, direct the processing system to:
    collect sensor data from physical sensors distributed over a geographic region;
    establish logical sensors each apportioned composite sensor data having selected portions of the sensor data originating from more than one of the physical sensors, wherein the selected portions of the sensor data are selected based at least on locations monitored by the physical sensors that correspond to requirements indicated by data requestors;
    provide the composite sensor data in one or more data streams to the data requestors as originating from the logical sensors;
    identify a transition event associated with a first physical sensor being unable to capture further sensor data for at least an object of interest in the geographic region;
    determine one or more alternative physical sensors capable of capturing the further sensor data; and in response to the transition event, transition a corresponding logical sensor to receive data from the one or more alternative physical sensors instead of the first physical sensor.

11. The apparatus of claim 10, wherein the program instructions, based on being executed by the processing system, direct the processing system to:
collect the selected portions of the sensor data from multiple ones of the physical sensors and compositing the selected portions of the sensor data into the composite sensor data as corresponding to a single logical sensor addressable as a physical sensor.

12. The apparatus of claim 10, wherein the selected portions of the sensor data correspond to the first physical sensor for a first period of time and to a subsequent physical sensor for a second period of time.

13. The apparatus of claim 12, wherein the first period of time and the second period of time correlate to orbital movement with respect to the geographic region for satellite devices comprising the first physical sensor and the subsequent physical sensor.

14. The apparatus of claim 10, wherein the first physical sensor captures first sensor data corresponding to a first portion of the object of interest, and wherein a second physical sensor captures second sensor data corresponding to a second portion of the object of interest, and wherein the composite sensor data comprises the first sensor data and the second sensor data.

15. The apparatus of claim 10, wherein the program instructions, based on being executed by the processing system, direct the processing system to:
convert the selected portions of the sensor data in a first data format to a target data format comprising the composite sensor data.

16. The apparatus of claim 10, wherein the program instructions, based on being executed by the processing system, direct the processing system to:
process the sensor data to identify relevant portions of the sensor data according to the requirements indicated by the data requestors; and
allocate the relevant portions of the sensor data to corresponding logical sensors.

17. The apparatus of claim 10, wherein the program instructions, based on being executed by the processing system, direct the processing system to:
store the composite sensor data as separate encrypted data pools that each correspond to individual ones of the data requestors.

18. A system comprising:
physical nodes configured to collect sensor data from physical sensors distributed over a geographic region; and
a management element configured to:
establish logical sensors each allocated composite sensor data having selected portions of the sensor data originating from more than one of the physical sensors, wherein the selected portions of the sensor data are selected based at least on locations monitored by the physical sensors that correspond to requirements indicated by data requestors,
provide the composite sensor data in one or more data streams to the data requestors as originating from the logical sensors;
identify a transition event associated with a first physical sensor being unable to capture further sensor data for at least an object of interest in the geographic region;
determine one or more alternative physical sensors capable of capturing the further sensor data; and
in response to the transition event, transition a corresponding logical sensor to receive data from the one or more alternative physical sensors instead of the first physical sensor.

* * * * *